(12) United States Patent
Kis (10) Patent No.: US 9,813,289 B2
(45) Date of Patent: Nov. 7, 2017

(54) TECHNIQUE FOR CONFIGURING A SOFTWARE-DEFINED NETWORK

(71) Applicant: Telefonaktiebolaget L M Ericsson (publ), Stockholm (SE)

(72) Inventor: Zoltán Lajos Kis, Budapest (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 339 days.

(21) Appl. No.: 14/264,333

(22) Filed: Apr. 29, 2014

(65) Prior Publication Data
US 2014/0325038 A1 Oct. 30, 2014

(30) Foreign Application Priority Data

Apr. 30, 2013 (EP) ..................................... 13002306

(51) Int. Cl.
*G06F 15/16* (2006.01)
*H04L 12/24* (2006.01)
*H04L 29/06* (2006.01)

(52) U.S. Cl.
CPC .......... *H04L 41/0803* (2013.01); *H04L 69/22* (2013.01); *H04L 41/04* (2013.01); *H04L 69/16* (2013.01)

(58) Field of Classification Search
CPC ..... H04L 41/04; H04L 41/0803; H04L 69/16; H04L 69/22
See application file for complete search history.

(56) References Cited

U.S. PATENT DOCUMENTS

| 7,962,656 | B1* | 6/2011 | Ang | H04L 69/12 709/250 |
|---|---|---|---|---|
| 2002/0019853 | A1* | 2/2002 | Vange | H04L 69/16 709/207 |
| 2005/0289555 | A1* | 12/2005 | Jiang | G06F 9/542 719/310 |
| 2008/0031257 | A1* | 2/2008 | He | H04L 12/2697 370/395.31 |
| 2009/0052337 | A1* | 2/2009 | Ban | H04L 41/0813 370/248 |

(Continued)

FOREIGN PATENT DOCUMENTS

EP 2544409 A1 1/2013

OTHER PUBLICATIONS

Ramos, R. M., et al., "Data Center Fault-Tolerant Routing and Forwarding: An Approach Based on Encoded Paths," 2013 Sixth Latin-American Symposium on Dependable Computing. Apr. 1-5, 2013. pp. 104-113. Rio de Janeiro, Brazil.

*Primary Examiner* — Aftab N. Khan
(74) *Attorney, Agent, or Firm* — Patent Portfolio Builders, PLLC (57) ABSTRACT

A technique for configuring a Software-Defined Network (SDN) is provided. A first control message is issued by a Software-Defined Network controller. The first control message is received at a first network device of the SDN. The first control message includes a SDN configuration command. Two or more second network devices of the SDN are determined as recipients of the SDN configuration command or as intermediate nodes towards recipients of the SDN configuration command. The first network device sends second control messages to the determined two or more second network devices.

18 Claims, 7 Drawing Sheets

(56) References Cited

U.S. PATENT DOCUMENTS

| | | | |
|---|---|---|---|
| 2010/0153532 A1* | 6/2010 | Ozawa | H04L 67/125 709/223 |
| 2011/0261825 A1 | 10/2011 | Ichino | |
| 2011/0274112 A1* | 11/2011 | Czaszar | H04L 63/0227 370/392 |
| 2013/0010600 A1 | 1/2013 | Jocha et al. | |
| 2013/0028257 A1* | 1/2013 | Ludwick | H04L 61/106 370/392 |
| 2014/0089506 A1* | 3/2014 | Puttaswamy Naga | H04L 45/42 709/225 |
| 2014/0092765 A1* | 4/2014 | Agarwal | H04W 24/02 370/252 |

* cited by examiner

TECHNIQUE FOR CONFIGURING A SOFTWARE-DEFINED NETWORK

RELATED APPLICATIONS

This application claims priority under 35 U.S.C. §119 from European Application No. 13002306.2 filed on 30 Apr. 2013, the content of said application incorporated herein by reference in its entirety.

TECHNICAL FIELD

The present disclosure relates to a technique for configuring a Software-Defined Network (SDN). In particular, and without limitation, the disclosure relates to a method and an apparatus for implementing a propagation mechanism for control messages in the SDN.

BACKGROUND

Software-Defined Networking is a paradigm in network design. In a Software-Defined Network, the network control plane is not configured individually for each of the network devices but managed by a central SDN controller. The SDN controller is a centralized software platform. Notable examples for protocols used for implementing an SDN include the OpenFlow protocol specified in the OpenFlow Switch Specification, Version 1.3.1, standardized by the Open Network Foundation, and the ForCES protocol suite defined by the Internet Engineering Task Force (IETF).

Centralization means that in an SDN, the network control logic is performed on a centralized software platform, and the decisions (e.g., as to routing and forwarding of data packets) are executed by physical or virtual network devices distributed throughout the network. In order to communicate control decisions, the SDN controller must have a connection established to each of the network devices.

US 2013/0010600 A1 describes a technique for executing operations, administration and management or maintenance (OAM) functions. An OpenFlow controller includes an OAM module that services OAM function requests in a network implementing OpenFlow. A subset of OpenFlow switches in the network report metrics for OpenFlow data flows to provide the OAM module with information for executing the requested OAM functions. OAM packets are correspondingly inserted into the OpenFlow data flows.

EP 2 544 409 A1 discloses a technique for inserting OpenFlow OAM packets into an OpenFlow data flow. A network element receives the OpenFlow OAM packets from a source through a port of the network element. An OpenFlow switch module matches the OpenFlow data packets using a matching structure received by the network element to identify the OpenFlow OAM packets. The identified OpenFlow OAM packets are forwarded to a flow table or group table of the OpenFlow switch module to aggregate the OpenFlow OAM packets with a corresponding OpenFlow data flow.

US 2011/0261825 A1 describes an OpenFlow communication system including an OpenFlow switch that controls transmission and reception of a packet according to a flow entry. An OpenFlow controller generates a registration flow entry, which is stored in a flow table of a specific OpenFlow switch arranged on a route of a communication flow. The specific OpenFlow switch extracts the registration flow entry from an encapsulated packet to produce a new flow entry and executes an action indicated in the new flow entry.

Existing SDN architectures rely on traditional network protocols for implementing transport connections for the control traffic between instances of the centralized SDN controller and the individual network devices. In particular, the Transmission Control Protocol (TCP) on transport layer 4 in conjunction with the Internet Protocol (IP) on the network layer 3 are used as transport mechanisms for the control traffic. Each of the SDN controller instances has to maintain a separate TCP connection for each network device. Similarly, each network device has to maintain a TCP connection per SDN controller instance. The number of TCP connections as well as the number of hops along each TCP connection increases as the size of the SDN increases. This poses a scalability limitation for large scale networks.

Furthermore, the controller instances and the network devices can maintain only a limited number of active TCP connections, e.g., due to hardware and software re-source limitations. In addition, TCP control connections can slow or prevent changes to the network flow, since an increasing number of TCP connections also have to be changed in case of in-band control.

SUMMARY

Accordingly, there is a need for a scalable technique for configuring a Software-Defined Network.

According to one aspect, a method of configuring a Software-Defined Network (SDN) is provided. The method comprises the steps, which are performed by a first network device of the SDN, of receiving a first control message issued by an SDN controller, wherein the first control message includes an SDN configuration command; determining two or more second network devices of the SDN as recipients of the SDN configuration command or intermediate nodes towards recipients of the SDN configuration command; and sending second control messages to the determined two or more second network devices.

At least some realizations may allow terminating a transport connection for the first control message at the first network device. In same or some other realizations, a plurality of parallel transport connections at the SDN controller can be avoided. Same or some other realizations can avoid a plurality of transport connections through the first network device and/or using a link between the first and second network devices. For example, a number of transport connections maintained for control messages through the first network device, or any other finite subset of the SDN, can be reduced and/or can become essentially independent of the size of SDN. Herein, the size may be quantified by, e.g., a number of SDN nodes in the SDN.

Herein, the expression "network device" can encompass both an SDN node and an SDN controller. The recipients and/or the second network devices may include one or more SDN controllers. The SDN may include a plurality of SDN nodes and one or more SDN controllers.

The first network device may be an intermediate node of the SDN. The first control message may be received via other network devices. The recipients may include the first network device, the second network devices and/or other SDN controllers. The second message may include the SDN configuration command of the first control message.

The method may further comprise the step of analyzing the first control message for determining the recipients. The recipients may be determined based on the SDN configuration command.

A plurality of first control messages may be received. The method may further comprise the steps of prioritizing and/or queuing the first control messages before the sending the second control messages. The recipients may be determined based on at least one of an identifier included in the first control message and the SDN configuration command included in the first control message. The first message may include an identifier of the sending SDN controller.

The first control message may include device identifiers. Each of the device identifiers may uniquely identify one recipient of the SDN configuration command. Alternatively or in combination, the first control message may include a group identifier collectively identifying the two or more second network devices.

At least one of the first control message, the second control messages and the one or more SDN configuration commands may be backward compatible to the OpenFlow protocol or the FoCES protocol. Existing SDN-compatible controllers and/or network devices may be partially used in the SDN.

The first network device may be an intermediate node of the SDN. The first control message may be sent via a transport connection that terminates at the first network device. The transport connection for the first control message may differ from any transport connection used for sending the second control messages.

At least one or all of the second control messages may be sent via individual transport connections between the first network device and the respective one of the second network devices. The transport connections between the first network device and different ones of the second network devices may use different transport protocols. All of the second network devices may be next-neighbor nodes relative to the first network device.

All transport connections used for the first and second control messages may be limited to next-neighbor transport connections, e.g., transport connections between neighboring nodes in the network. Throughout the control plane, the first and second network devices may maintain transport connections only with neighboring nodes.

The first and second control message may use the data plane, which is also referred to as in-band control. The first control message may be received via a first TCP connection between the SDN controller and the first network device. The second net-work devices may not need to maintain a transport connection with the SDN controller. The second messages may be sent via second TCP connections to the second network devices. The first and second TCP connections may terminate at the first network device. The second messages may be sent to the second network de-vice via neighbor-to-neighbor transport connections. The first network device may send one or all of the second messages based on a determined recipient, and irrespective an IP header and/or a TCP header included in the first control message.

At least one or each of the first and second network devices may autonomously maintain a control connections table indicative of a status of transport connections to next-neighbor nodes. Entries in the control connections table are added or deleted in accordance with the first control message or a dedicated control message from the SDN controller. The control connections table may further be indicative of network devices and/or SDN controllers indirectly reachable via the next-neighbor connections as potential recipients.

The second network devices may be determined by querying the control connections table of the first network device based on the recipients. An error message may be sent to the SDN controller, if a control packet is received by the first network device and the control connections table includes no entry for at least one of the recipients. The error message may include the entire first control message.

The first network device may further maintain a flow control table. The flow control table may be used for forwarding a control packet only if the control packet is received via a data path not listed in the control connections table of the first network device and/or the recipient of the control packet is not listed in the control connections table.

The recipients may include one or more other SDN controllers of the SDN. The second message may be sent towards the one or more other SDN controllers. The second message sent to another SDN controller may allow synchronizing distributed SDN controller databases.

The method may further comprise determining that the first control message is destinated to the first network device. The first network device may process such a first control message with or without sending any second control messages.

Some or all of the first and second network devices may include switches. The switches may be SDN-compatible. The SDN controller may be implemented by a centralized server.

According to a further aspect, a computer program product is provided comprising program code portions for performing any embodiment of above method aspect when the computer program product is executed on a computing device. Further, a computer-readable recording medium storing the computer program product is pro-vided. The computer-readable recording medium may take the form of a semiconductor memory and/or an optical memory. Still further, the computer program product may be provided for download onto such a computer-readable medium, e.g., via a network connection.

As to a hardware aspect, an apparatus for configuring a Software-Defined Network, or SDN, is provided. The apparatus comprises a receiving unit adapted to receive a first control message issued by an SDN controller, the first control message including an SDN configuration command; a determining unit adapted to determine two or more second network devices of the SDN as recipients of the SDN configuration command or intermediate nodes towards recipients of the SDN configuration command; and a sending unit adapted to send second control messages to the deter-mined two or more second network devices.

The apparatus may further comprise a memory unit adapted to locally store a control connections table associating an identifier included in the first control message to one of the transport connections maintained by the first network device.

BRIEF DESCRIPTION OF THE DRAWINGS

In what follows, further details and advantages of the disclosure are described with reference to exemplary embodiments illustrated in the drawings, wherein FIG. 1 schematically illustrates a control plane topology of an SDN.

DETAILED DESCRIPTION

Hereinafter, for purposes of explanation and not limitation, specific details are set forth, such as particular sequences of steps and network configurations, in order to provide a thorough understanding of the present disclosure. It will be apparent to a person skilled in the art that the disclosure may be practiced in other embodiments that depart from these specific details. For example, while the embodiments are described with reference to a backhaul network of a mobile telecommunications network according to 3GPP LTE specifications, it will be apparent to the skilled person that the disclosure may also be practiced in the context of mobile telecommunications networks being compatible to one or more other specifications, such as LTE and UMTS. The disclosure can also be applied to a generic data network. Furthermore, while the disclosure is primarily described for in-band control, the disclosure may, partially or completely, be implemented in a network with out-of-band control connections.

Moreover, those skilled in the art will appreciate that services, functions, logical models and steps explained herein may be implemented using software functioning in conjunction with a programmed microprocessor, or using an Application Specific Integrated Circuit (ASIC), a Digital Signal Processor (DSP) or a general purpose computer. The ASIC may include one or more crossbars coupled to shared memory. It will also be appreciated that, while the following embodiments are described in the context of a method and an apparatus, the technique presented herein may also be embodied in a computer program product as well as in a system comprising a computer processor and a memory coupled to the processor, wherein the memory is encoded with one or more programs configured to execute the services, functions, logical models and steps disclosed herein.

Figure 1:
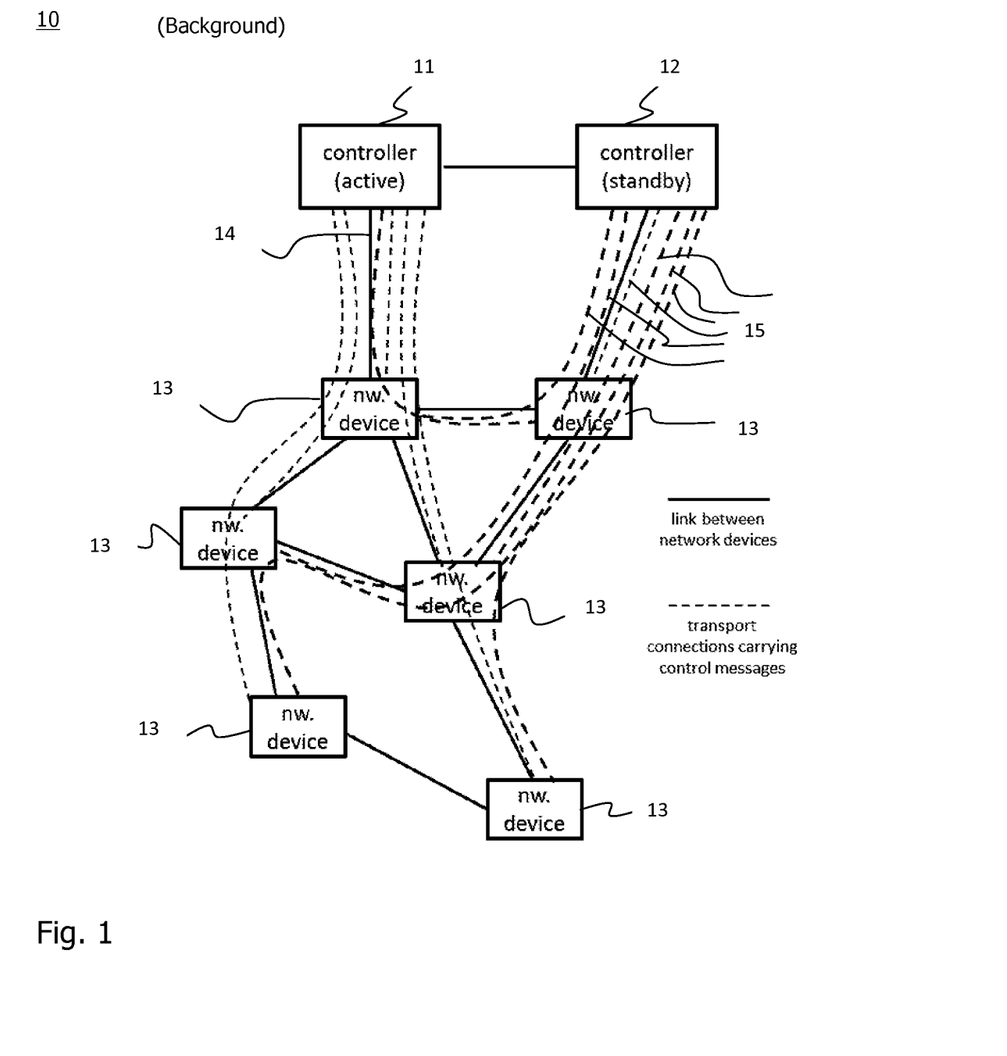

FIG. 1 schematically illustrates an exemplary Software-Defined Network (SDN) 10 useful for the understanding of the technique disclosed herein. The SDN 10 includes two instances 11 and 12 of an SDN controller and a plurality of SDN nodes 13 as network devices. The SDN controller instance 11 is active and the SDN controller 12 is in a standby mode providing fallback functionality in the case of failure of the SDN controller instance 11.

Physical links between the network devices are indicated by solid lines 14. Transport connections 15 for carrying control messages, e.g., TCP connections, are indicated by dashed lines. Each of the SDN controller instances 11 and 12 needs to maintain at least one separate TCP connection 15 with each of the network devices 13. The controller instances 11 and 12 use in-band control to connect to the network devices 13. In addition, each of the network devices 13 maintains a separate TCP connection 15 with each of the SDN controller instances 11 and 12, e.g., for feedback to the SDN controller. Separate TCP connections 15 for each of the controller instances 11 and 12 facilitate failover in case of a controller instance error.

The dashed lines schematically illustrate the resulting topology of end-to-end control transport connections 15, which are also referred to as control channels. Multiple control transport connections towards different network devices 13 or SDN controller instances 11 and 12 share the same physical links 14 and the same network devices 13. While FIG. 1 shows an in-band control design, a similar topology of end-to-end control transport connections 15 results when using a dedicated control network for an out-of-band design. Under heavy traffic in the control plane and/or the data plane, shared links and shared nodes become congested leading to increased delays of the control messages carried along the transport connections 15.

Moreover, as the number of network devices 13 in the SDN 10 increases, the number of control transport connections 15 sharing the same network device 13 and/or the same physical link 14 increases, for which reasons the exemplary SDN 10 of FIG. 1 suffers from a scalability limitation.

Figure 2:
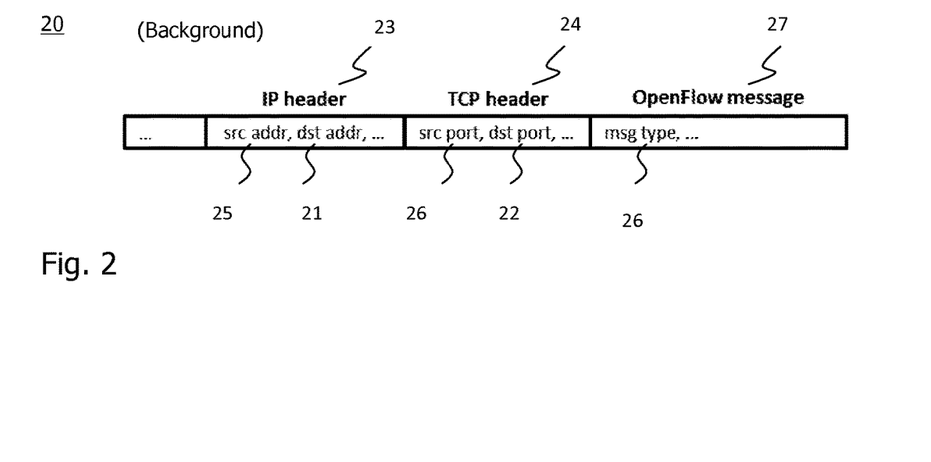
FIG. 2 schematically illustrates a data structure of a control message according to an existing control protocol used for implementing the SDN shown in FIG. 1.

FIG. 2 schematically illustrates the structure of an exemplary control message 20 according to the OpenFlow protocol useful for the understanding of the technique disclosed herein. The control message 20 is transferred over the SDN network 10 using a dedicated one of the TCP control connections 15. A target network device (i.e., a target SDN node or SDN controller) is identified by a combination of destination IP address 21 and destination TCP port 22 included in the IP header 23 and TCP header 24, respectively, of the control message 20. Similarly, the source is identified by the combination of source address 25 and source port 26. The message itself, i.e., a message content 27, does not carry any identification of the target network device. For example, the OpenFlow protocol assigns to each of the network devices 13 a unique network device identifier denoted by Data Path Identifier (DPID), which is not included in the OpenFlow messages.

Figure 3:
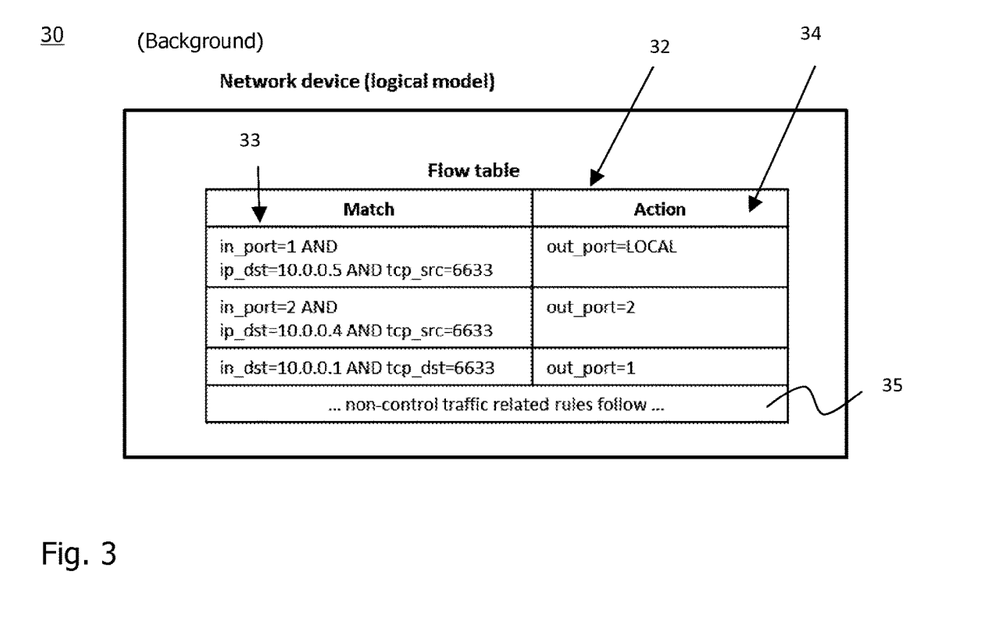
FIG. 3 shows a flow table defining a forwarding logic that is locally implemented in a network device of the SDN shown in FIG. 1.

FIG. 3 schematically illustrates a flow table 32 specifying a logical model 30 for the network device 13 of FIG. 1. Each line in the flow table 32 corresponds to a rule inserted into the flow table 32 by the SDN controller 11. The rules thus specify a control message processing on the transport layer of the protocol stack. Each of the rules instructs the network device 13 to forward a specific one of the TCP flows 15 carrying control traffic, or to handle its own control traffic locally. The "Match" column 33 of the flow table 32 specifies the TCP flow 15 solely based on IP addresses and TCP port numbers. The "Action" column 34 specifies whether to forward the received control message 20, which is indicated by a numerical out port, or to locally process the received control message 20, which is indicated by the value "LOCAL" for the out port. The flow table 32 also includes rules 35 for data traffic.

The content 27 of the control message 20 specifies an SDN configuration command, e.g., a request for statistics. The SDN controller 11 has to send the same message to multiple network devices 13. Conversely, each of the network devices 13 has to send the same message to multiple SDN controller instances 11 and 12, e.g., to share state updates among the multiple SDN controller instances. The control communication is handled as a point-to-point and end-to-end transport connections 15. Therefore, the control messages 20 are duplicated at the sending end for each recipient, resulting in the very same message content 27 being transported over multiple transport connections 15 spanning the same physical links 14.

At least some of the embodiments of the technique disclosed herein provide an SDN protocol, an SDN controller and/or a network device adapted to handle control connectivity on a message level, e.g., an application layer of the protocol stack. Instead of end-to-end transport connections 15, the network devices forward control messages among each other. The forwarding depends on message content. IP address fields and TCP port fields do not have to be analyzed for the forwarding decision. The control messages are forwarded along neighbor-to-neighbor transport connections. No transport layer session has to be maintained for each combination of individual network device and SDN controller instance.

In contrast, the exemplary network devices 13 for software-defined networking illustrated in FIG. 1 forward the control messages on the transport layer and are unable to treat the control traffic at a control message level. For example, the network devices 13 are unable to prioritized more important control messages.

An embodiment of the network device is adapted to execute a higher functionality of SDN control. For example, the intermediate node can prioritize and/or queue control messages. Group communications can be implemented for the control messages. Thus, the higher functionality can improve network efficiency and scalability. The message level analysis can allow improving overall network efficiency and reducing control message delays, which can cause an inconsistent configuration of the SDN.

The technique can be implemented for an SDN using an in-band control. In-band control means that the data plane of the SDN is used for transporting the control traffic managed by the SDN controller. SDN with in-band control provides better energy efficiency, e.g., because the SDN controller can steer control traffic away from under-utilized links so that such links and/or corresponding network devices can enter a low-energy mode. Furthermore, the network devices adapted for in-band control require only a minimal control logic, which enables cost-effective network devices.

The technique and at least some of its benefits can also be realized in the context of out-of-band control. Out-of-band control means that the functionality of an SDN controller does not have to be centralized, or that the SDN includes a network dedicated for control traffic separate from the data plane of the SDN. As an example, the control traffic may use the data plane of the SDN but is administratively separated, e.g., using a Virtual Local Area Network (VLAN). In particular, aspects of the technique relating to the network device or not requiring an active role of a centralized SDN controller are directly applicable to an SDN with out-of-band control.

Moreover, while below embodiments are described in the context of OpenFlow, the technique is directly applicable to other SDN architectures using a centralized SDN controller, e.g., according to the ForCES protocol. The technique can be implemented as an extension of existing SDN protocols, such as the OpenFlow protocol and the ForCES protocol.

Figure 4:
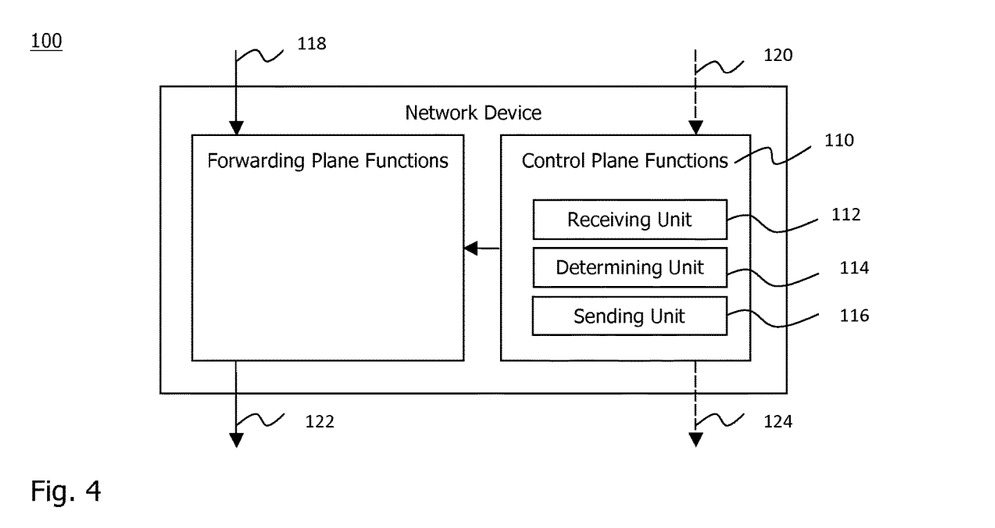
FIG. 4 shows a block diagram of a network device including an embodiment of an apparatus for configuring an SDN.

FIG. 4 schematically illustrates a network device 100 for software-defined networking. The network device 100 includes an apparatus 110 for configuring a Software-Defined Network (SDN). The apparatus 110 includes a receiving unit 112, a determining unit 114 and a sending unit 116.

Figure 5:
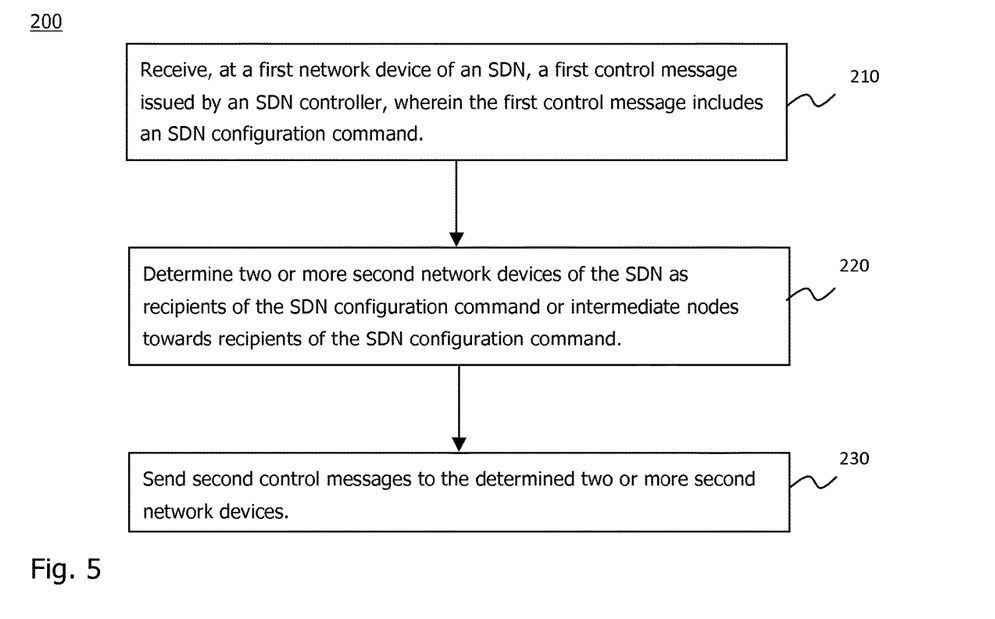
FIG. 5 shows a flow chart of a method embodiment for configuring an SDN.

FIG. 5 shows a flowchart for a method of configuring a Software-Defined Network (SDN). In a step 210 of the method 200, a first control message issued by an SDN controller is received at a first network device of the SDN. The first control message includes an SDN configuration command, e.g., a command for retrieving data from a network device or for modifying a state of the network device. Two or more second network devices of the SDN are determined as recipients of the SDN configuration command or as intermediate nodes towards recipients of the SDN configuration command in a step 220 of the method 200. In addition, the first network device can also be a recipient of the SDN configuration command. In a step 230 of the method 200, second control messages are sent from the first network device to the determined two or more second network devices.

The first network device can be realized by the network device 100 shown in FIG. 4. The units 112, 114 and 116 of the apparatus 110 are adapted to perform the steps 210, 220 and 230, respectively.

The network device 100, shown in FIG. 4 includes units dedicated for either forwarding plane functions or control plane functions. In a variant of the network device 100, data traffic 118 and control traffic 120 are received at the same physical in-port. In the variant, at least some of the units 112 to 116 are implemented by components also implementing functions of the forwarding plane. Furthermore, data traffic 122 and control traffic 124 forwarded by the network device 100 can be sent using the same out-port of the network device 100.

Figure 6:
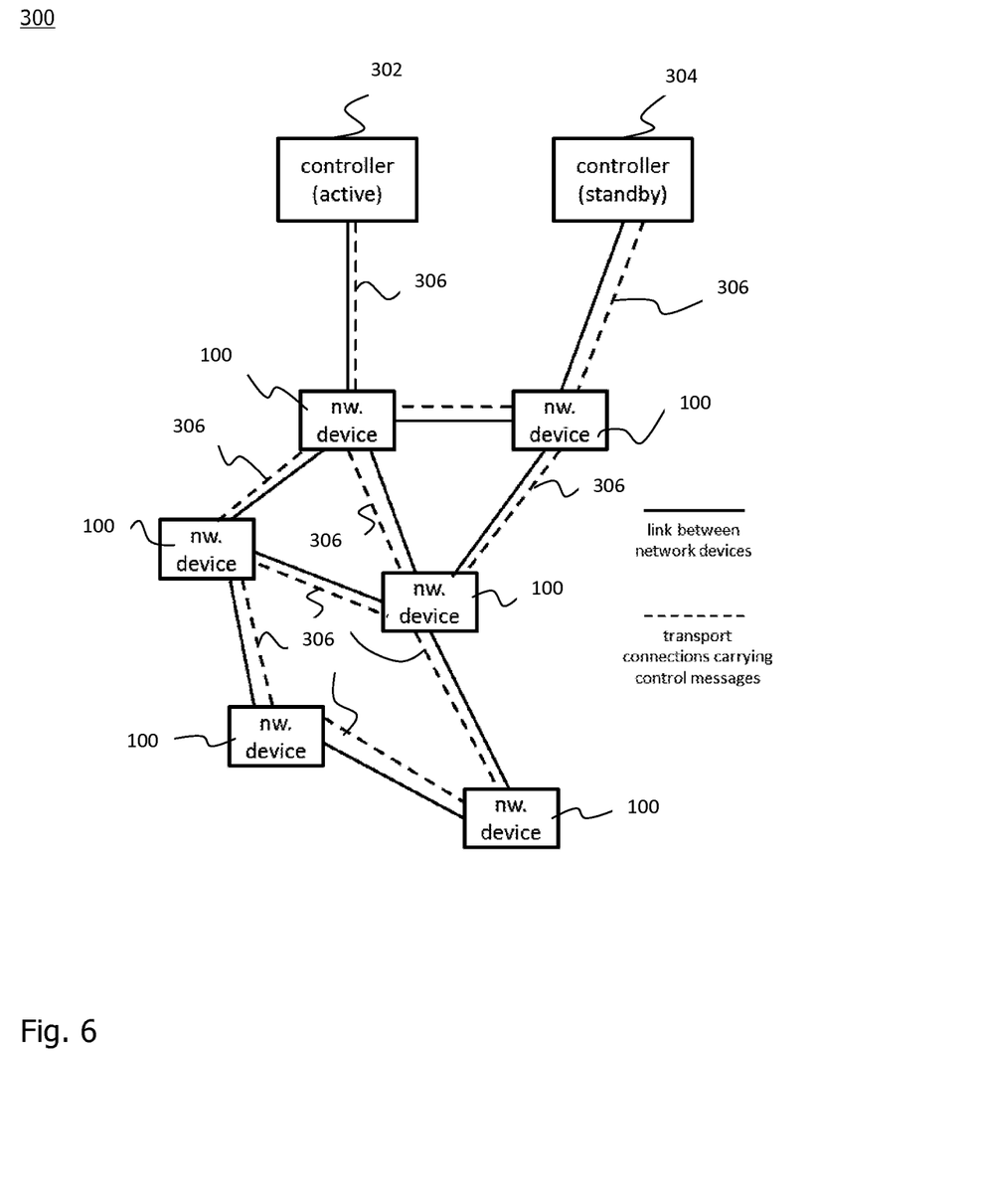
FIG. 6 schematically illustrates an SDN including SDN controllers and a plurality of the network devices shown in FIG. 4.

FIG. 6 schematically illustrates an SDN 300 including the network devices 100. The SDN 300 includes distributed SDN controllers 302 and 304. For example, the SDN controllers 302 and 304 are multiple instances of the same SDN controller object. As opposed to the bilateral transport connections 15 maintained between each of the SDN controllers 302 and 304 and each of the network devices 100, the network device 100 only maintains short control transport connections 306. For example, a number of hops (i.e., a number of intermediate nodes along each of the transport connections for control traffic) may be limited, e.g., to one, two, or three hops. In the SDN 300 shown in FIG. 6, the first network device 100 maintains control transport connections only to its next neighbors as examples of the second network devices 100.

As a result of the network devices 100 operated according to the method 200, the topology of control traffic connections 306 is substantially simplified. There is no more need for maintaining end-to-end control transport connections 15. Rather, peer-to-peer transport connections are established between neighboring network devices 100, over which the control messages are forwarded by receiving the first control message and sending two or more second control messages. Furthermore, the control transport connections can be implemented using any one of the well-established protection and restoration schemes to provide resilience for the control plane of the SDN based on the network devices 100.

Figure 7:
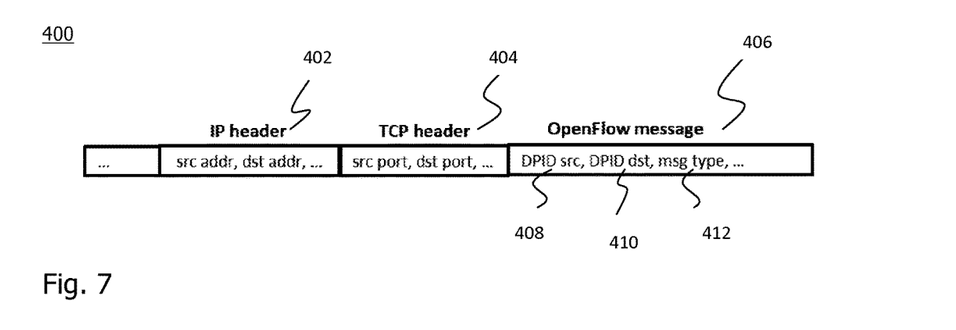
FIG. 7 schematically illustrates a structure of a control message according to an SDN protocol implemented in the apparatus shown in FIG. 4 and performed by the method of FIG. 5.

FIG. 7 schematically illustrates a data structure for a control message 400 according to an SDN protocol. The SDN protocol can be considered as an extension of existing SDN protocols, such as the OpenFlow protocol.

The control message 400 includes an IP header 402, a TCP header 404 and a data field 406 including message content. The header fields 402 and 404 can be identical to any one of the existing SDN protocols. The control message 400 is extended to carry an identifier of network devices 100. A source identifier 408 uniquely identifies the sending network device. Each of one or more destination identifiers 410 uniquely identifies a network device to which the control message 400 is targeted to. Controller instances are also assigned unique identifiers using the same format of identifiers that is used for identifying nodes. Herein, the term "network device" relates to an intermediate node of the SDN 300, e.g., any one of the network devices 100, or an instance of the SDN controller, e.g., any one of the instances 302 and 304.

Figure 8:
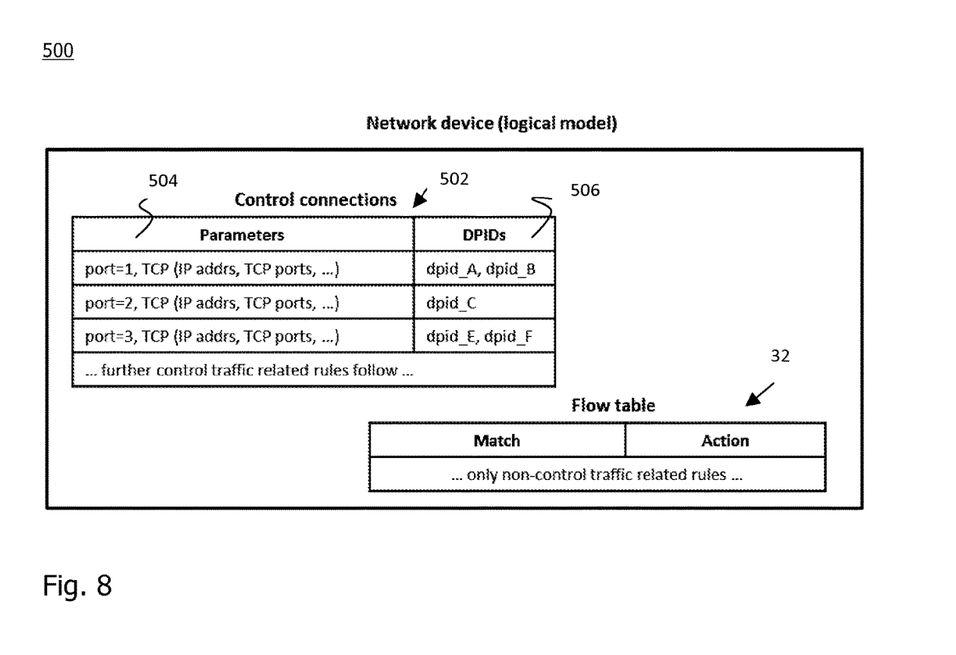
FIG. 8 schematically illustrates a logical model of the network device shown in FIG. 4, including a control connections table.

An implementation of the technique in the context of an OpenFlow SDN is shown in FIGS. 7 and 8 using the Data Path Identifier (DPID) of the OpenFlow protocol as the identifier of network devices. The DPIDs of the SDN controller instances 302 and 304 are communicated to the network devices 100 via specific control messages 400 upon bootstrap of the SDN 300.

The header fields 402 and 404 are irrelevant for forwarding the control message 400 by any one of the network devices 100 acting as the first network device of the method 200. The first network device forwards the received first control message 400 based on the destination identifier 410 by sending a second control message 400 including an SDN configuration command 412 identical to, or derived from, the SDN configuration command 412 included in the first control message 400. The second control messages 400 are sent to the next neighbor network devices 100 determined based on the destination identifiers 410 as the second network devices using the transport connections 306.

In a variant, the first network device 100 determines the second network devices 100 based on an analysis of the data field 406 of the first control message 400, e.g., based on an analysis of the SDN configuration command 412.

FIG. 8 schematically illustrates a logical model 500 of the first network device 100. The logical model 500 specifies the forwarding behavior of the first network device 100 according to the method 200. The logical model 500 can be implemented as an extension of existing implementations of SDN network devices and extension of existing SDN protocols using the flow table 32 described above.

The network device 100 is extended including a table 502 storing parameters 504 of active control transport connections 306 maintained by the first network device 100. The parameters 504 thus specify potential second network devices 100 directly and actively connected to virtual or physical ports of the first network device 100. The control connections table 502 thus lists active control transport connections available for determining the second network devices 100 in the step 220 and sending the second control message 400 in the step 230. A state required by the active control transport connections 306 of the first network device 100, e.g., TCP windows and sequence numbers, is maintained autonomously by the first network device 100 and is not exported to the control connections table 502.

The control connections table 502 further includes a column 506 specifying network device identifiers as recipients reachable via the corresponding connection specified in the column 504. When the first network device 100 receives a control packet (including the control message 400 or being part of the control message 400), the control connections table 502 is consulted. The first network device 100 searches its locally stored control connections table 502 for a matching recipient. If the received control packet does not match to any one of the control connections listed in the control connections table 502, the processing of the received control packet is forwarded to the flow table 32. The technique thus allows a smooth migration from an existing SDN network at least temporarily maintaining the control flow processing according to the flow table 32.

If the packet is received at the first network device 100 via a dedicated control connection and/or if an analysis of the received packet yields a matching network device identifier 506 of a second network device, the packet is processed separately according to the control connections table 502.

The first network device 100 extracts the control message content 406, if applicable, after reassembling TCP segments. If the first control message is designated to the first network device 100, the included SDN configuration command 412 is locally executed. If the first control message is exclusively or additionally designated to one, two, or more other recipients, the first control message 400 is forwarded as a second control message 400 according to the step 230 via the control transport connection 306 specified for this recipient by means of the matching network device identifier 506 in the control connections table 502 to the neighboring second network device 100, which IP address and TCP port are specified in the parameter 504 corresponding to the matching network device identifier 506.

In case the recipient specified by the destination network device identifier 410 is not reachable, e.g., because the destination network device identifier 410 has no matching network device identifier 506 in the control connections table 502, the first net-work device 100 sends an error message as the second control message 400 to the SDN controller, e.g., the currently active SDN controller instance 302. The error message includes the complete first control message, so that after repairing the configuration of the SDN, the first control message can be resent. The repairing is achieved by sending an additional first control message 400 including an SDN configuration command 412, which causes the receiving first network device 100 to add the missing recipient as a new entry into the control connections table 502.

A network device identifier of one of the SDN controller instances 302 and 304 in the control connections table 502 specifies a feedback path to the SDN controller for the error message, in case a control packet received by the first network device 100 has no matching network device identifier 506 in the control connections table 502.

The control connections table 502 is populated and modified using specific control messages 400 issued by the SDN controller 302. For example, the centralized SDN controller 302 manages the forwarding rules defined by the control connections table 502 by means of a control message 400 including a modify-state message as the SDN configuration command 412.

Furthermore, the control plane architecture resulting from the technique enables any-to-any messaging, whereas the existing SDN protocols only enabled controller-to-device messaging, and vice versa. In the SDN network 100, any network device 100 is enabled to send a control message 400 to any other network device, including the intermediary network devices 100 and the SDN controller instances 302 and 304.

The technique thus enables distributed SDN controllers, e.g., multiple SDN controller instances 302 and 304, to communicate with each other by means of control messages

400. For example, the control messages 400 exchanged between distributed SDN controller instances 302 and 304 include data fields 406 for synchronizing databases included in each of the SDN controller instances 302 and 304. In the case of an in-band control implementation of the SDN 300, the distributed SDN controller instances 302 and 304 are synchronized over the data plane of the SDN 300, whereas a conventional controller synchronization in the SDN 10 required a dedicated synchronization network between controller instances 11 and 12.

By means of the SDN configuration command 412 included in the first control message 400, the SDN controller specifies the control message forwarding, i.e., the forwarding behavior throughout the control plane of the SDN 300. For example, the active centralized SDN controller instance 302 has complete control over the path, which individual control messages 400 are to take.

Once a minimum set of short (e.g., neighboring) control transport connections 306 is established between the network devices 100 in the SDN 300, the SDN controller is free to create or modify the short control transport connections on the whole SDN 300. In a minimum configuration, the SDN controller establishes one spanning tree starting from each of the SDN controller instances 302 and 304. In a maximum configuration, the SDN controller establishes a transport connection 306 between all neighboring pairs of network devices 100, thus creating a full mesh for the control plane of the SDN 300. In the latter configuration, the SDN controller can freely setup forwarding rules over the full mesh for the individual recipients specified by the network device identifiers, e.g., the DPIDs, by manipulating the control connections table 502 of the network devices 100.

In many cases, a network device (e.g., any one of the intermediate network devices 100 or any one of the SDN controller instances 302 and 304) has to send the same SDN configuration command 412 to multiple recipients. For example, when the SDN controller instance 302 requests statistics from multiple network devices 100, or when one of the intermediate network devices 300 sends a state update to multiple SDN controller instances 302 and 304, the same SDN configuration command 412 is addressed to the multiple recipients by means of a corresponding multiplicity of destination network device identifiers 410 included in a single first control message 400.

Compared to the transport based on the plurality of control channels 15 described with reference to FIGS. 1 to 3, the technique disclosed herein allows sending the same first control message 400. Duplications of the first control message are avoided at the issuer of the first control message 400. A duplication of the control message occurs not until the first network device 100, which is a branching node for the multiple recipients 410 listed in the first control message 400.

Figure 9:
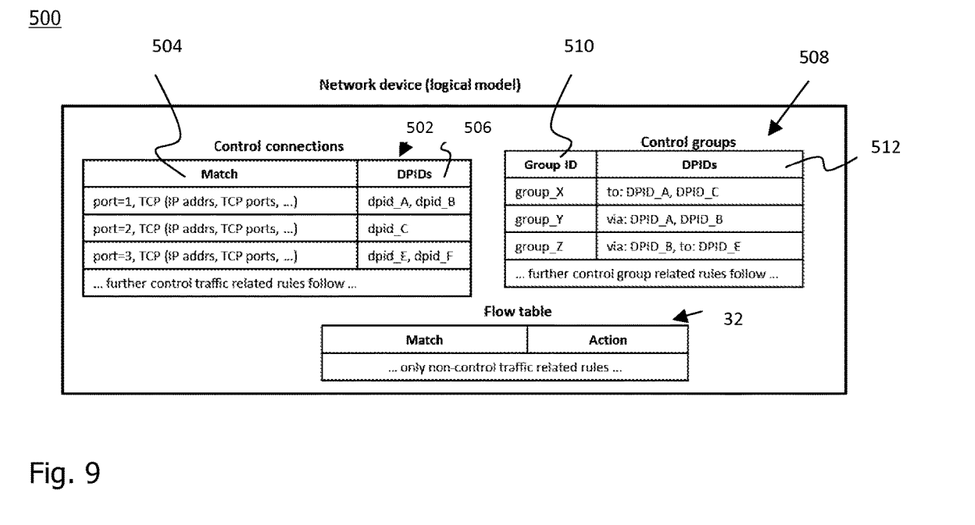
FIG. 9 schematically illustrates a logical model of the network device shown in FIG. 4, further including a control groups table.

FIG. 9 shows an extension of the logical model of FIG. 8 for the first network device 100. To facilitate addressing multiple recipients by means of a single first control message 400, a group identifier is used instead of the network device identifier 410 in the first control message 400. The logical model 500 is extended by including a control groups table 508. The control groups table 508 maps the group identifier in column 510 to a list of two or more network device identifiers in column 512 as recipients. The recipients can include only intermediate network devices 100, only SDN controller instances 302 and 304, or a combination of both controller and intermediate network device.

The SDN controller creates the control groups (which are also referred to as logical groups) by adding, removing or modifying entries in the control groups table 508 by means of specific control messages 400 received by the first network device 100 locally storing the control groups table 508.

Upon receiving the first control message 400, the first network device 100 determines, if the destination identifier 410 only includes network device identifiers (e.g., one or more DPIDs), in which case the control connections table 502 is consulted as described with reference to FIG. 8. In case the received first control message 400 includes at least one group identifier (e.g., at the position of the destination identifier 410), the control groups table 508 is consulted by the first network device 100. The control groups table 508 instructs the first network device 100 to execute for the received first control message 400 one or more actions out of at least two actions.

The first action is a branching action for the received first control message 400. The group identifier at the position of the destination identifier 410 is replaced with the specific network device identifiers 512 in duplications of the first control message in the step 220. Each of the amended duplication is forwarded based on the control connections table 502 as the second control message 400 according to the step 230. The branching action is triggered by the presence of at least one network device identifier as the recipient of the SDN configuration command 412 in the matching entry of the control groups table 508. In the embodiment of the control groups table 508 shown in FIG. 9, recipients are defined by the keyword "to".

The second action is a forwarding action. The first network device 100 forwards the first control message 400 as the second control message without changing the destination group identifier 412 via the directly connected (e.g., neighboring) second network device 100 specified in the control groups table 508 after the keyword "via".

A group identifier 510, for which the control groups table 508 includes both a "via"-entry and a "to"-entry triggers both the branching action and the forwarding action.

In case the destination group identifier 412 in the received first control message 400 does not exist in the control groups table 508, the first network device 100 sends an error message 400 to the SDN controller instance 302 including the complete first control message in the data field 406 of the error message 400.

The control groups are an elegant means of addressing the same SDN configuration command to multiple recipients due to its network efficiency avoiding duplications at the sender. Moreover, the destination network devices specified by the destination group identifier do not have to be aware of the fact that they are members of any of the logical groups. The technique provides a forwarding mechanism for group messages that is absolutely transparent to members of the group.

The technique disclosed herein uses peer-to-peer connections for the control plane of the SDN 300. The technique allows shortening the number of hops for the control transport connections 306. For example, only next neighbor control transport connections 306 are maintained by each of the network devices 100. Consequently, the technique allows combining different transport mechanisms or transport protocols along the data path between network devices exchanging a control message. In contrast, the exemplary SDN 10 maintains control transport connections 15 from end to end, which requires the same transport protocol for the entre data path.

For example, in heterogeneous networks, e.g., involving a combination of any one of optical, wired or wireless connections in the data plane (used for the in-band control), it is beneficial if network functions are implemented differently by different network protocols spanning over different network regions.

Some embodiments of the network device 100 are adapted to local needs. For example, in case of a wireless medium connecting the first network device 100 with one or more of the second network devices, the step 230 can utilize another protocol with more forward error correction. As a further example, if a physical medium is a broadcast medium on the physical layer, e.g., a single-carrier wireless connection or an Ethernet branch including multiple terminals, the destination group identifier 510, described with reference to FIG. 9, can specify a group corresponding to the second network devices 100 directly connected to the first network device 100 by means of the broadcast medium.

In a first implementation, the neighboring first and second network devices 100 agree on changing the transport protocol, e.g., by exchanging peer messages. The SDN controllers, e.g., each of the SDN controller instances 302 and 304, are subsequently notified. In a second implementation, the SDN controller, e.g., the active SDN controller instance 302, requests the neighboring first and second network devices 100 to change the transport protocol. Optionally, the SDN controller sends the SDN configuration command requiring the change of the transport protocol after gathering environment information from the corresponding network devices by sending a first control message 400.

The network device 100 can be considered an extension of an existing network device 13, e.g., by including the control connections table 502. The SDN protocol implemented according to the method 200 can be considered an extension of an existing SDN protocol, e.g., by specifying the destination identifier 410 in the control message 400. As an advantage, the technique is backward compatible.

The compatibility can be negotiated during setup of the control plane for the SDN 300. The setup procedure is also referred to as a bootstrapping procedure. Descriptions of procedures for establishing an in-band control plane are provided, e.g., in the OpenFlow specification "In-Band Control with OpenFlow", by Justin Pettit, 25 Sep. 2009 (published on mailman.stanford.edu).

An embodiment of a bootstrapping procedure for in-band control according to the technique presented herein is described. A network device 100, which is not yet connected to the control plane of the SDN 300, periodically sends a discovery request, e.g., a messages according to the Dynamic Host Configuration Protocol (DHCP). The SDN controller listens on its direct links to receiving a discovery message. Once a discovery message reaches the SDN controller, the SDN controller sends, in reply, a first control message containing an SDN configuration command to the network device 100. The SDN configuration command instructs the network device 100 to establish a control transport connection to the SDN controller.

The bootstrapping procedure differs from the existing procedure. After connecting the new network device 100 and before the new network device is requested to forward discovery messages (from other newly connected network devices), the SDN controller sends an upgrade request by means of a further first control message 400. The SDN configuration command 412 included in the further first control message 400 requests information from the first network device 100 as to whether the first network device 100 is capable of using the extended SDN protocol. If so, the SDN controller instructs the first network device 100 to enable its local control connections table 502.

If the network device 100 participates in the upgrade to the extended SDN protocol, the SDN controller further updates the control transport connections table 502 of each of the intermediary network devices 100, which act as the first network device 100 according to the method 200 so as to forward first control messages in the sense of a step 210 to the newly connected network device 100 and to forward second messages in the sense of the step 230 from the newly connected network device 100.

As result, the newly connected network device 100 is connected according to the extended SDN protocol, if supported by the newly connected network device 100. Otherwise, the newly connected network device is individually connected by means of the end-to-end control transport connection 15, if the newly connected network device does not support the extended SDN protocol. The now connected network device is instrumented by the SDN controller to forward discovery messages received via the control plane. When a discovery message forwarded in the control plane is received by the controller, the steps of sending the reply and checking whether the discovered network device supports the extended SDN protocol are repeated, so that the control plane iteratively extends to the size corresponding to the data plane.

The technique thus allows automatically setting up the control plane for in-band control. Furthermore, changes in the SDN topology by removing or adding network devices 100 cause an update of the newly connected network device and the intermediate network devices along the data path to the SDN controller. Furthermore, the SDN 300 can comprise a combination of legacy network devices 13 and network devices 100.

Figure 10:
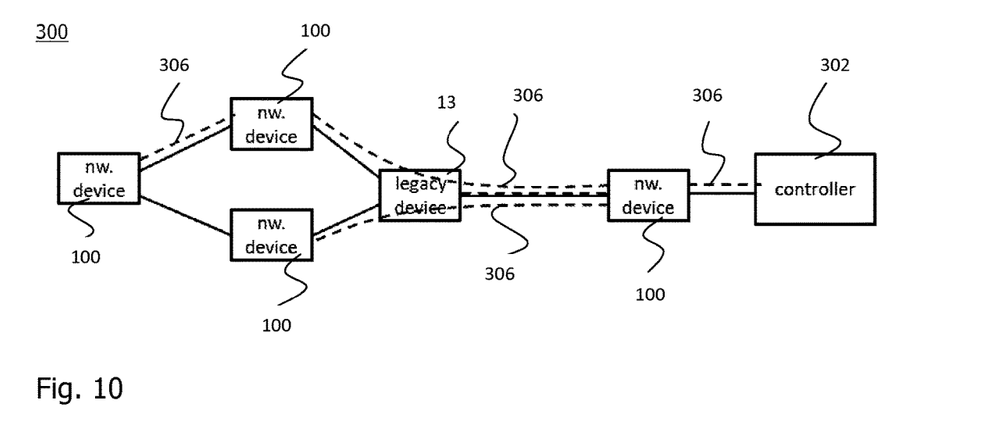
FIG. 10 shows an SDN including both the network devices shown in FIG. 4 and a legacy network device shown in FIG. 1.

FIG. 10 schematically illustrates control transport connections 306 in an SDN 300 including both legacy network devices 13 and network devices 100. Only one SDN controller instance 302 is shown in FIG. 10 for the clarity of the illustration. The technique does not limit the number of SDN controller instances, when applied in the context of an SDN also including legacy devices 13.

As is illustrated in FIG. 10, the conventionally "long" control transport connections through legacy network devices 13 are terminated by the network device 100, which is closest to the legacy network device 300 in a data path towards the SDN controller 302. From the perspective of legacy network devices 13 connected via the network device 100 to the SDN controller 302, the intermediate network device 100 represents the SDN controller by extracting first control messages 400 and forwarding them as second control messages to the legacy network device 13 and, vice versa, by extracting first messages from the legacy device 13 and forwarding them as second control messages 400 to the SDN controller 302.

Moreover, the network device 100, the SDN protocol and the bootstrap procedure facilitate intermediary legacy network devices 13, which is also shown in FIG. 10. The SDN controller 302 is adapted to instruct the legacy network device 13 to forward first control messages by means of the existing flow table 32 on the transport layer to network devices 100 topologically arranged further away from the SDN controller 302 (i.e., network devices 100 arranged "behind" the legacy network device 13). Pairs of neighboring network devices 100 topologically, which are arranged further away from the SDN controller 302 than the legacy network device 13 and which communicate with the SDN controller 302 via a data path through the legacy network device 13, establish and maintain neighbor-to-neighbor transport connections 306, as described above for the "pure" SDN 300 including only network devices 100.

In architectures of the control plane using end-to-end control transport connections 15 between controller 12 and network device 13, authentication can be implemented by relying on the authentication functionality provided by the transport layer. For example, Transport Layer Security (TLS) and its predecessor, Secure Sockets Layer (SSL), are applicable for authentication between controller 12 and network device 13.

When reducing the length of control transport connections, e.g., a reduction to neighbor-to-neighbor transport connections, these authentication functionalities are insufficient, since a man-in-the-middle attack at an intermediate network device 100 would not be prevented.

Figure 11:
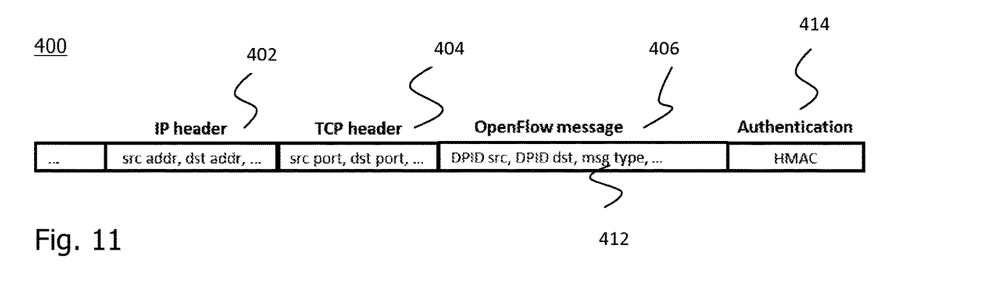
FIG. 11 schematically illustrates a data structure of the control message according to the SDN protocol enhanced for authentication.

FIG. 11 schematically illustrates a data structure for the control message 400, further including an authentication field 414. The authentication field identifies the sender of the control message 400 and prevents certain attacks. Existing certificate functionality, e.g., a Keyed-Hash Message Authentication Code (HMAC), can be included in the authentication field 414 of the control message 400. In addition, well-established cryptographic functionalities can be applied to the data field 406 of the control message 400.

As part of the higher functionality of SDN control enabled for the network device 100, the control messages 400 can be implicitly or explicitly prioritized, or both. When one of the second network devices 100 and/or a link attached to the first network device 100 (e.g., a link underlying one of the transport control connections 306 maintained by the network device 100) is overloaded, the network device 100 temporarily stores incoming packets and forwards them later. Depending on a preset maximum buffer size, stored packets are dropped. In the SDN 10 shown in FIG. 1, priorities can be set by the controller 12 only for the entire control transport connection 15. A prioritization performed by the network device 100 achieves a more fine-grained prioritization along the data path.

In a first implementation of the implicit prioritization of a control packet, e.g., including or being part of a control message 400, the network device 100 analyzes the content 406 of the control message 400, e.g., a message type or the SDN configuration command 412 included in the first control message 400. An error message sent by a network device 100 towards the SDN controller 302 is assigned a high priority. Delay-intolerant control messages 400, e.g., control messages reporting on a hard-state change, are a further example of high-priority control messages 400. The hard-state relates to states of the network device 100, for which a preset maximum number of recovery attempts has failed.

In a second implementation of the implicit prioritization, a static set of rules assigns priorities to different message types 412. When the network device 100 needs to buffer first control messages 400, the forwarding of the corresponding second control messages 400 depends on the priority assigned to the message type 412. Furthermore, in case a maximum buffer size is reached, the received and buffered first control messages 400 are discarded starting with the lowest priority.

In a variant, the second control messages are generated by the first network device 100 and sent in the step 230, as far as possible. Only a second control message 400 to be sent on a congested data path segment 504 is buffered, so that other branches are not delayed by the overload.

In an advanced embodiment of the network device 100 adapted for implicit and/or explicit prioritization, the control connections table 502 includes a further column that indicates different data paths for different priorities. For example, the first network device 100 is capable of rerouting lower priority control packets to take a data path with more delay.

As a further embodiment compatible with any other embodiment described herein, the network device 100 sends the first control message 400 back to the SDN controller, e.g., after a maximum buffering time has expired. The first control message 400 is sent back to the SDN controller in the form of an error message. Additionally, the error message indicates to the SDN controller 302 that the first control message 400 is to be resent later. The error message can use semantics similar to the socket error message EAGAIN of unixoidal systems.

Figure 12:
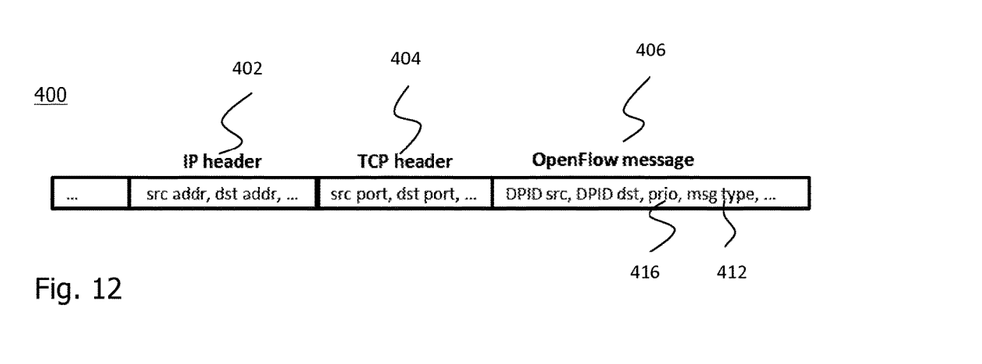
FIG. 12 schematically illustrates a data structure of the control message according to the SDN protocol enhanced for prioritization.

Alternatively or in combination with the implicit prioritization, the network device 100 is adapted to extract an explicit priority value 416 from the data field 406 of the first control message 400. An exemplary data structure of the control message 400 is shown in FIG. 12.

The explicit priority value 416 is set by the SDN controller. The explicit priority value 416 enables the SDN controller to overrule a statically predefined priority or any other implicit priority value derived, e.g., based on the message type 412.

By way of example, the explicit priority value 416 is introduced by the SDN controller 302 for taking an accurate snapshot of network statistics. The first control message includes a statistics request as the SDN configuration command 412 and has to suffer from as little delay as possible so that the snapshot is completed in a relatively short time interval for the entire SDN network 300 or a certain network region thereof. To this end, the SDN controller 302 temporarily sets the priority value 416 of the first control messages 400 including the statistics request as the SDN configuration command 412 higher than the priority values 416 included in other first control messages 400 including state updates as the SDN configuration command 412.

In the network device 100, the buffer for temporarily storing the received first control messages 400 is sorted according to the priority value 416, if included in the first control message 400, or according the implicit priority, if no explicit priority is included in the first control message 400.

In a variant of the explicit prioritization implementation, a global relative priority metric is represented by the priority value 416. Every network devices (including intermediate network nodes 100 and SDN controllers 302 and 304) prioritize their control packets according to sender priority values determined by the SDN controller and distributed by means of the control messages 400 throughout the SDN 300.

Each of authentication and prioritization is an aspect of the technique that can be implemented as the higher functionality of SDN control in the network device 100 independent of any other aspect disclosed herein.

As has become apparent from above description of exemplary embodiments, at least some of the embodiments do not require maintaining separate control transport connections between each combination of SDN controller and intermediary network devices. Same or other embodiments enable using different transport protocols for different media that implement the physical layer of links between the network devices.

Independent of, or additionally to, a branching action performed by the network devices, the network device can locally prioritize received control messages based on an analysis of the control message and/or a relative priority explicitly included in the control message.

Independent of, or additionally to, the prioritization, the network device can perform a branching action significantly improving network efficiency and avoiding redundant control traffic.

What is claimed is:

1. A method of configuring a Software Defined Network (SDN), the method comprising the following steps performed by a first network device of the SDN:
   receiving a plurality of first control messages issued by an SDN controller, wherein the SDN controller is executing on a device comprising a processor and memory, each of the plurality of first control messages including an SDN configuration command in a data field;
   analyzing the data field of each of the plurality of first control messages for determining recipients of the SDN configuration command;
   prioritizing the plurality of first control messages based on the analysis;
   determining two or more second network devices of the SDN as the recipients of the SDN configuration command or intermediate nodes towards the recipients of the SDN configuration command; and
   sending second control messages to the determined two or more second network devices based on the priorities assigned to each of the plurality of first control messages, the second control messages including the SDN configuration command,
   wherein the first network device autonomously maintains a control connections table indicating different data paths for different priorities assigned to the plurality of first control messages,
   wherein the first network device further maintains a flow control table, which is used for forwarding a control packet only when the control packet is received via a data path not listed in the control connections table of the first network device and/or the recipient of the control packet is not listed in the control connections table, and
   wherein the recipients include one or more other SDN controllers of the SDN, and wherein the second control messages sent towards the one or more other SDN controllers allow synchronizing distributed SDN controller databases.

2. The method of claim 1, wherein the recipients are determined based on at least one of an identifier included in each of the plurality of first control messages and the SDN configuration command included in each of the plurality of first control messages.

3. The method of claim 1, wherein each of the plurality of first control messages include device identifiers, each of which uniquely identifies one recipient of the SDN configuration command.

4. The method of claim 1, wherein at least one of the plurality of first control messages includes a group identifier collectively identifying two or more recipients of the SDN configuration command.

5. The method of claim 1, wherein the first network device is an intermediate node of the SDN and each of the plurality of first control messages is sent via a transport connection that terminates at the first network device.

6. The method of claim 1, wherein entries in the control connections table are added or deleted in accordance with at least one of the plurality of first control messages or a dedicated control message from the SDN controller.

7. The method of claim 1, wherein the data field of each of the plurality of first control messages comprises a source identifier, one or more destination identifiers, the SDN configuration command, and a priority value.

8. The method of claim 1, wherein the priority to each of the plurality of first control messages is assigned by the SDN controller.

9. The method of claim 1, wherein at least one or all of the second control messages are sent via transport connections between the first network device and the respective second network devices.

10. The method of claim 9, wherein the transport connections between the first network device and the respective second network devices use different transport protocols.

11. The method of claim 9, wherein the second network devices are next-neighbor nodes of the first network device.

12. The method of claim 11, wherein the control connections table is further indicative of a status of transport connections to the next-neighbor nodes.

13. The method of claim 1, wherein the control connections table is further indicative of at least one of network nodes and other SDN controllers as recipients reachable via the next-neighbor nodes as the intermediate nodes.

14. The method of claim 13, wherein the second network devices are determined by querying the control connections table of the first network device based on the recipients.

15. The method of claim 14, further comprising sending an error message to the SDN controller, when a control packet is received by the first network device and the control connections table includes no entry for at least one of the recipients.

16. An apparatus for configuring a Software Defined Network (SDN), the apparatus comprising:
   a processor configured to:
   receive a plurality of first control messages issued by an SDN controller, wherein the SDN controller is executing on a device comprising a processor and memory, each of the plurality of first control messages including an SDN configuration command in a data field;
   analyze the data field of each of the plurality of first control messages for determining recipients of the SDN configuration command;
   prioritize the plurality of first control messages based on the analysis;
   determine two or more second network devices of the SDN as the recipients of the SDN configuration command or intermediate nodes towards recipients of the SDN configuration command; and
   send second control messages to the determined two or more second network devices based on the priorities assigned to each of the plurality of first control messages, the second control messages including the SDN configuration command; and
   a memory coupled to the processor and configured to locally store a control connections table indicating different data paths for different priorities assigned to the plurality of first control messages
   wherein the memory is further configured to store a flow control table, which is used for forwarding a control packet only when the control packet is received via a data path not listed in the control connections table and/or the recipient of the control packet is not listed in the control connections table, and
   wherein the recipients include one or more other SDN controllers of the SDN, and wherein the second control messages sent towards the one or more other SDN controllers allow synchronizing distributed SDN controller databases.

17. The apparatus of claim 16, wherein the control connections table indicates an identifier included in each of the plurality of first control messages to a transport connection.

18. A non-transitory computer readable medium storing a computer program product comprising program code portions that, when executed by a computer processor of a first network device of a Software Defined Network (SDN), configure the first network device to:
- receive a plurality of first control messages issued by an SDN controller, wherein the SDN controller is executing on a device comprising a processor and memory, each of the plurality of first control messages including an SDN configuration command in a data field;
- analyze the data field of each of the plurality of first control messages for determining recipients of the SDN configuration command;
- prioritize the plurality of first control messages based on the analysis;
- determine two or more second network devices of the SDN as the recipients of the SDN configuration command or intermediate nodes towards the recipients of the SDN configuration command; and
- send second control messages to the determined two or more second network devices based on the priorities assigned to each of the plurality of first control messages, the second control messages including the SDN configuration command, wherein the first network device autonomously maintains a control connections table indicating different data paths for different priorities assigned to the plurality of first control messages, wherein the first network device further maintains a flow control table which is used for forwarding a control packet only when the control packet is received via a data path not listed in the control connections table of the first network device and/or the recipient of the control packet is not listed in the control connections table, and wherein the recipients include one or more other SDN controllers of the SDN, and wherein the second control messages sent towards the one or more other SDN controllers allow synchronizing distributed SDN controller databases.

* * * * *